United States Patent [19]
Nojiri et al.

[11] Patent Number: 5,256,445
[45] Date of Patent: Oct. 26, 1993

[54] METHOD AND APPARATUS FOR BUFFING AND PAINTING A ANNULATION

[75] Inventors: Yasushi Nojiri; Takanori Kohda, both of Kobe, Japan

[73] Assignee: Sumitomo Rubber Industries, Ltd., Hyogo, Japan

[21] Appl. No.: 890,166

[22] Filed: May 29, 1992

[30] Foreign Application Priority Data

May 31, 1991 [JP] Japan .................................. 3-128138

[51] Int. Cl.⁵ .......................... B05D 3/12; B24B 5/36
[52] U.S. Cl. ................................... 427/155; 427/286; 427/290; 427/428; 118/72; 118/211; 118/218; 118/227; 51/106 R; 51/289 R; 51/326
[58] Field of Search .................... 51/104, 106 R, 293, 51/326, 289 R, DIG. 33; 118/72, 211, 232, 244, 218, 227; 427/286, 290, 428, 155; 157/13; 152/DIG. 12; 156/116

[56] References Cited

U.S. PATENT DOCUMENTS

| | | | |
|---|---|---|---|
| 2,986,849 | 6/1961 | Clark | 51/106 R |
| 3,521,408 | 7/1970 | Neugebauer | 51/106 R |
| 3,729,041 | 4/1973 | Kubota | 152/DIG. 12 |
| 3,832,972 | 9/1974 | Pace | 118/316 |
| 3,977,131 | 8/1976 | Searle et al. | 51/106 R |
| 4,134,362 | 1/1979 | Rush | 118/232 |
| 4,515,200 | 5/1985 | Williams | 51/106 R |
| 4,663,889 | 5/1987 | Strand et al. | 51/106 R |
| 4,722,380 | 2/1988 | Botzman | 156/116 |
| 4,967,820 | 11/1990 | McCarthy | 51/106 R |
| 5,065,694 | 11/1991 | Earnheart, Jr. | 118/320 |
| 5,179,806 | 1/1993 | Brown et al. | 51/106 R |

FOREIGN PATENT DOCUMENTS

| | | | |
|---|---|---|---|
| 45-32617 | 10/1970 | Japan | 118/72 |
| 3-72975 | 3/1991 | Japan | 427/256 |
| 880745 | 10/1961 | United Kingdom | 51/106 R |

*Primary Examiner*—Terry J. Owens
*Attorney, Agent, or Firm*—Birch, Stewart, Kolasch & Birch

[57] ABSTRACT

A method for buffing an annulation comprising a step of rotating the annulation while holding the annulation, a step of partially grinding a surface of the annulation with a grinder unit, and a step of applying blue paint to the ground surface of the annulation. A buff apparatus used therefor comprises an annulation holding section, a grinder unit having a rough grinder and a finishing grinder, and a paint unit. The rough grinder and the finishing grinder on the grinder unit are driven by one cooperating shaft, and the grinder unit is capable of pivoting by 180 degrees. The paint unit is a transfer-roller-type and applies blue paint only to the ground surface.

7 Claims, 11 Drawing Sheets

METHOD AND APPARATUS FOR BUFFING AND PAINTING A ANNULATION

BACKGROUND OF THE INVENTION

The present invention relates to a method for buffing an annulation wherein the surface of an annulation is partially buffed with a rough grinder and a finishing grinder, and thereafter protective paint is applied to the finished surface. The present invention also relates to an apparatus used for the method.

A motor cycle tire (hereafter explanation is made based on a tire which is a typical annulation) with white lettering on both sides thereof is obtained by partially grinding the tire to expose a white color portion. Such grinding has been conventionally carried out with an apparatus having two pairs of a rough and a finishing grinders (namely four grinders), one pair being at a left side and the other pair being at a right side. After the tire is buffed, blue paint is applied to the white lettering to protect the surface thereof. Such painting has been conventionally carried out by spray method so that it is performed in a booth surrounding the spray means on every side in order to prevent the blue paint from scattering around.

In the conventional buffing there are problems that the apparatus is large due to the four grinders employed and that it takes a very long time to align each grinder. This alignment includes, for example, adjustment of a position in a tire diameter direction, inclination and press amount of the grinders against a reference plane of the ground part. As stated above, since the application of blue paint after buffing is carried out by a spray method, not only does much paint adhere to portions other than the desired portion but also a large paint booth which surrounds the spray means on every side in order to prevent the spray from scattering around is required. A further problem is that auxiliary equipment such as a suction duct connected with the booth is required.

In view of the above-mentioned problems an object of the present invention is to provide a method for buffing an annulation and an apparatus used therefor which can miniaturize the buffing apparatus.

SUMMARY OF THE INVENTION

In accordance with the present invention, there is provided a method for buffing an annulation comprising:

a step of rotating the annulation with holding the annulation;

a step of partially grinding a surface of the annulation with a grinder unit, the grinder unit having a rough grinder and a finishing grinder driven by one cooperating shaft, and being capable of pivoting by 180 degrees; and a step of applying blue paint to the ground surface of the annulation with a transfer-roller paint unit.

The present invention further provides a buff apparatus comprising:

an annulation holding section for rotating the annulation;

a grinder unit having a rough grinder and a finishing grinder; and a paint unit for applying blue paint to the ground surface wherein the rough grinder and the finishing grinder on the grinder unit are driven by one cooperating shaft, and the grinder unit is capable of pivoting by 180 degrees; and a buff apparatus comprising:

an annulation holding section for rotating the annulation;

a grinder unit having a rough grinder and a finishing grinder; and a paint unit for applying blue paint to the ground surface wherein the paint unit is a transfer-roller unit and applies blue paint only to the ground surface.

In a method and an apparatus of the present invention, a rough grinder and a finishing grinder are arranged on one frame as a grinder unit capable of turning ground, and these two grinders are driven by one motor and one shaft so that a compact apparatus is realized and the alignment for each grinder can get off with only one operation with respect to each side. Further in the apparatus a transfer roller is employed for the application of blue paint and after the buffing of a tire the application of blue paint can be performed at the very position without movement of the tire. For this reason, a blue paint machine which has been conventionally a separate equipment is miniaturized to be an auxiliary part of the apparatus, and the position of the transfer roller can be adjusted depending on the kind or size of tires, whereby blue paint can be applied only to a desired portion.

DETAILED DESCRIPTION OF PREFERRED EMBODIMENTS

An embodiment of the present invention is explained below with reference to the drawings.

Figure 4:
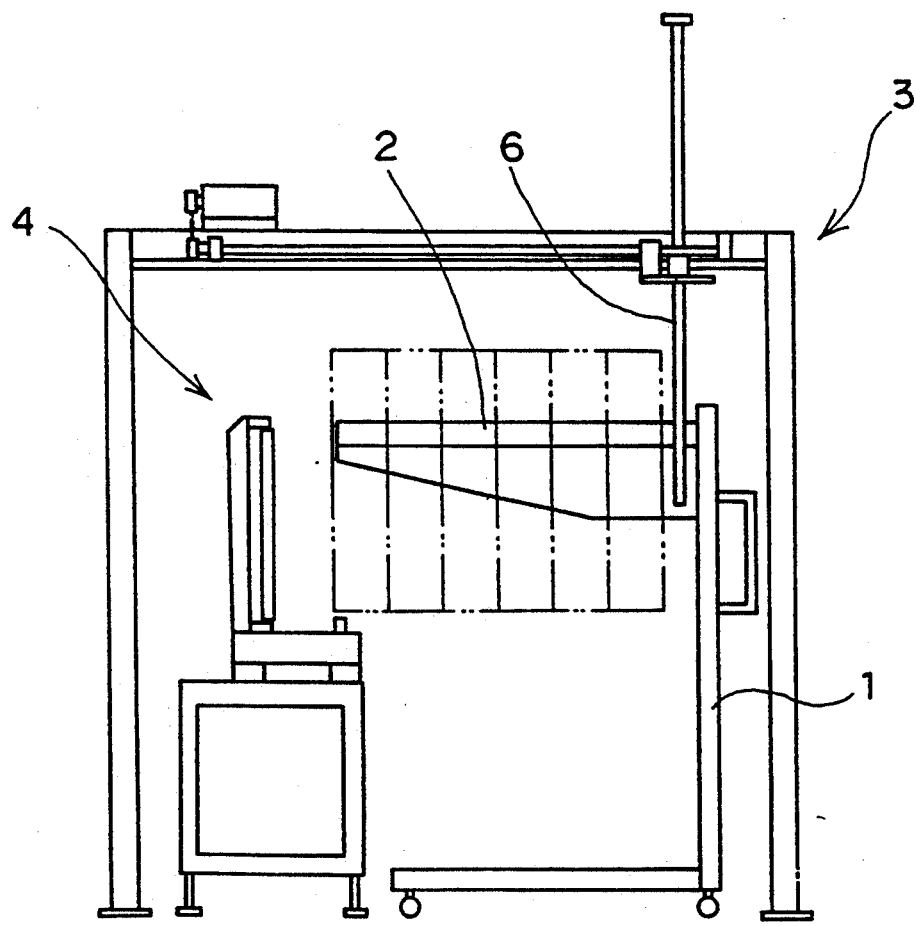
FIG. 4 is a side view of a tire supply section.

As shown in FIG. 4, a plurality of tires are stocked in a hanging manner for later buffing on two bar-stockers 2 (one of them only appears in FIG. 4) of a supply carriage 1. The carriage 1 is set in a tire supply section 3. The tire supply section 3 is a frame-like one capable of enclosing the carriage 1 therein, and encloses a carry chute 4 therein. The chute 4 carries a tire taken out from the stocker 2 to a rim region. The section 3 is provided on its top with a take out device 7 (refer to FIG. 2) comprising an air cylinder 5 and two bar-like members 6. When the carriage 1 is set in the section 3, the cylinder 5 moves the bars 6 down to a rearmost position behind the lined plural tires to be buffed (refer to FIG. 4). The bars 6, moved down, push a rearmost one of the lined tires so that a frontmost one of the lined tires falls on the chute 4 of the section 3, and then the bars 6 stop. By repeating this operation, the device 7 takes out the stocked tires one by one to supply the tire to the chute 4.

Figure 5:
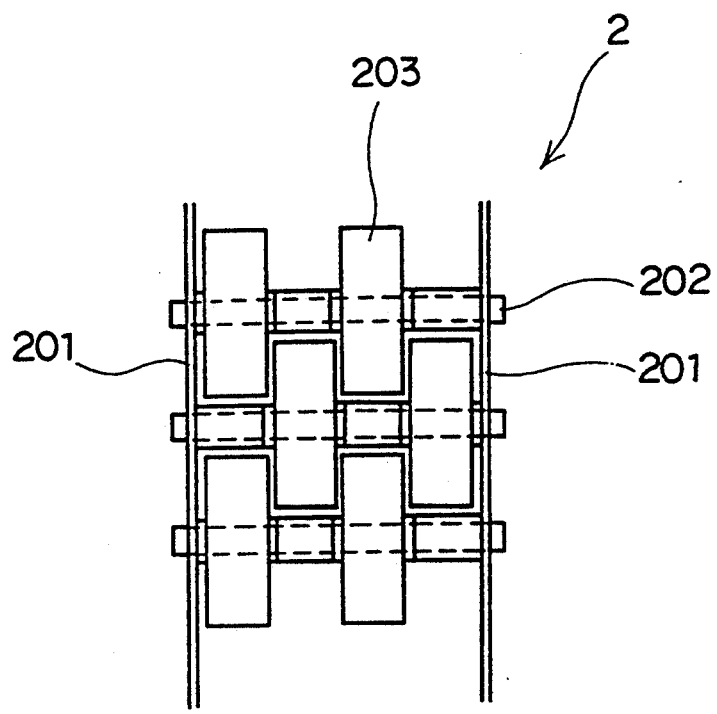
FIG. 5 is an explanatory view showing a structure of a bar-stocker of a supply carriage.

The bar-stocker 2 is shown in FIG. 5 in detail. Plural shafts 202 are arranged between two plates 201 to connect them with each other. Each shaft 202 has rollers 203, whereby the tires hung thereon can move smoothly when they are pushed by the bars 6.

Figure 2:
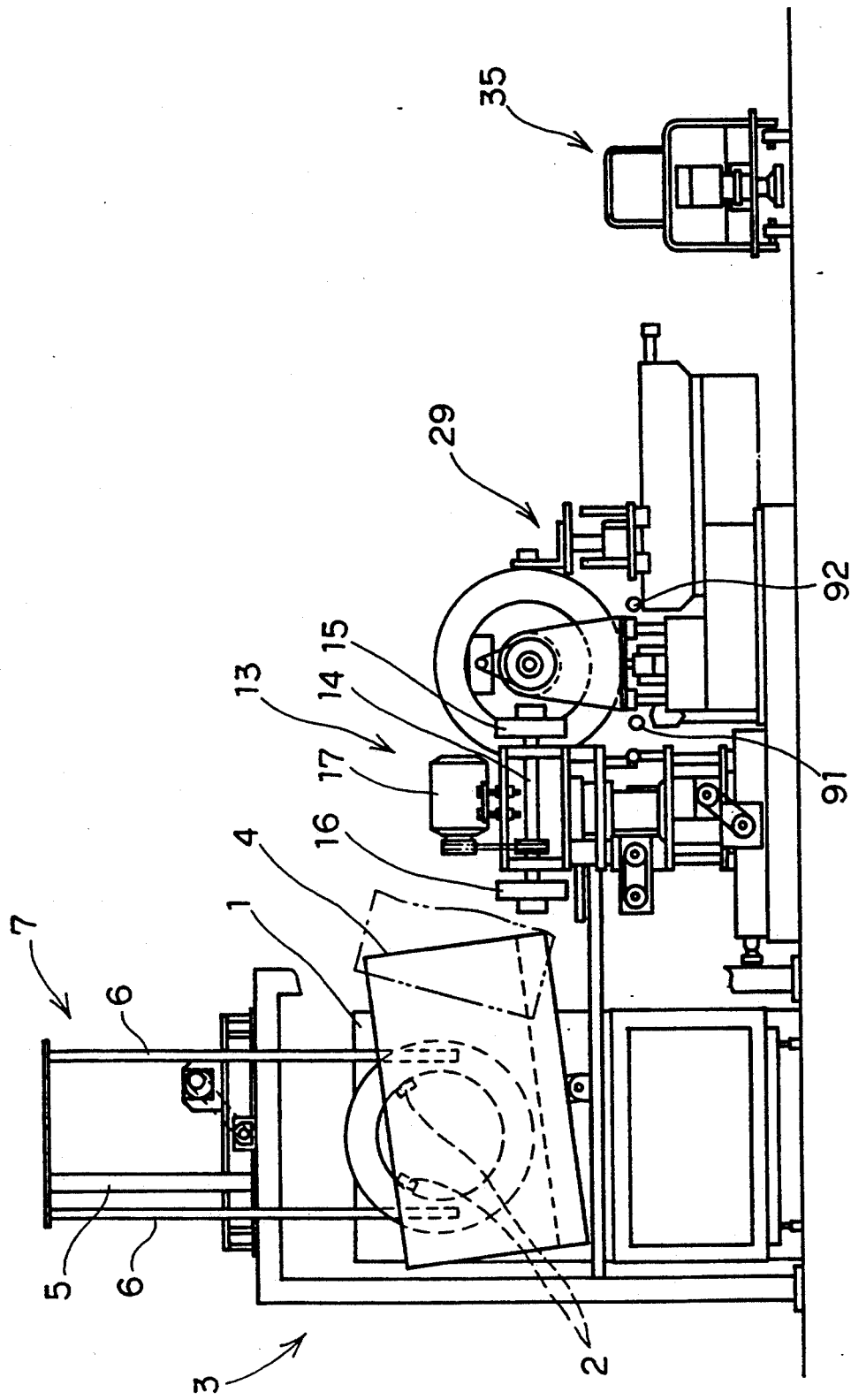
FIG. 2 is a schematic side view of the apparatus in FIG. 1.

The chute 4 is initially lowered at its left side (refer to FIG. 2). When a tire falls onto the chute 4, the chute 4 advances rightward in FIG. 2 by for example an air cylinder (not shown) while holding the fallen tire. In this operation, the tire does not fall leftward from the chute 4 thanks to a stopper (not shown) arranged at left edge of the chute 4. Thereafter the chute 4 is slightly rotated into a condition wherein it is inclined inversely to the initial inclination (this condition is partially shown in FIG. 2 by two-dot chain line). Any stopper is not arranged at right edge of the chute 4, so when the inclination of the chute 4 is inverted, the tire rolls and falls into a rim region (a region between a pair of rims 10 for inflating of a tire holding section 11).

The tire, which has fallen into the rim region, is received by stopper rollers 91 and 92, and is aligned in a "correct position". The "correct position" in this specification means a position where when each of the pair of rims 10 for inflating, facingly arranged at both sides of the rim region, advances to approach each other, they are correctly set to the fallen tire from both sides. Because the height of the pair of the rims 10 is constant, the height of a frame to which the two rollers 91 and 92 are attached is previously set depending on the tire size. This setting is performed with a mechanism (not shown) using for example a feed screw.

After the tire is set to the "correct position", the rims 10 for inflating arranged facingly at both sides of the rim region are driven by an air cylinder (not shown) and advance to approach each other till they hold the tire. After the tire is held, the frame holding the rollers 91 and 92 moves downward by an air cylinder (not shown). Then, the rims 10 are locked, and the held tire is inflated with pressurized air supplied therein. After inflation, the tire begins to rotate with a motor 12.

Figure 1:
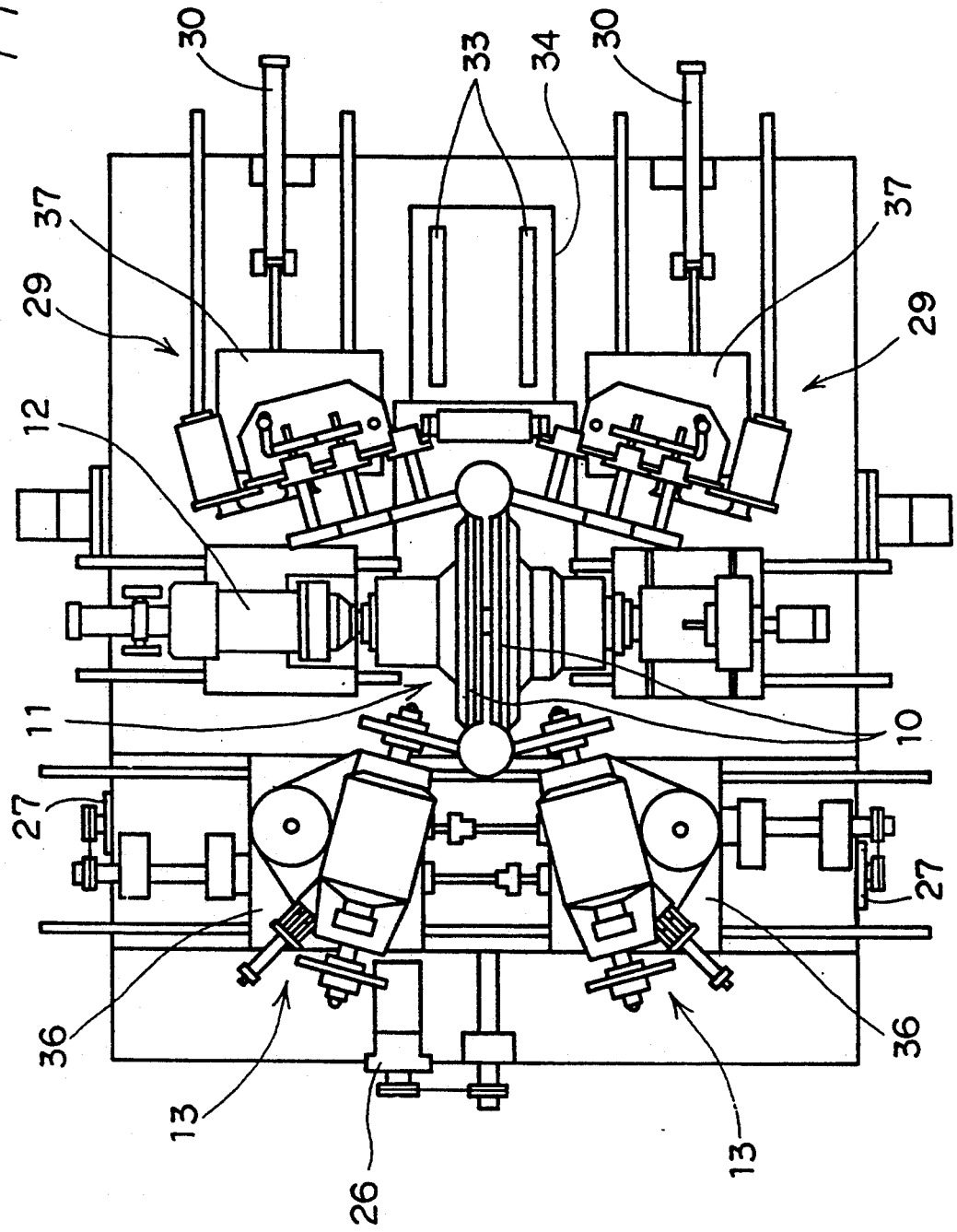
FIG. 1 is a schematic plan view of an embodiment of a buff apparatus of the present invention.

In FIG. 1, at the left hand of the tire holding section 11, a pair of grinder units 13 are arranged. As shown in FIG. 2, the unit 13 comprises a rough grinder 15, a finishing grinder 16, and a drive motor 17 for driving a shaft 14. Both grinders are fixed to each edge of one shaft 14. The unit 13 is mounted on a grinder mount 18 which rotates by a rotary actuator 19.

Figure 6:
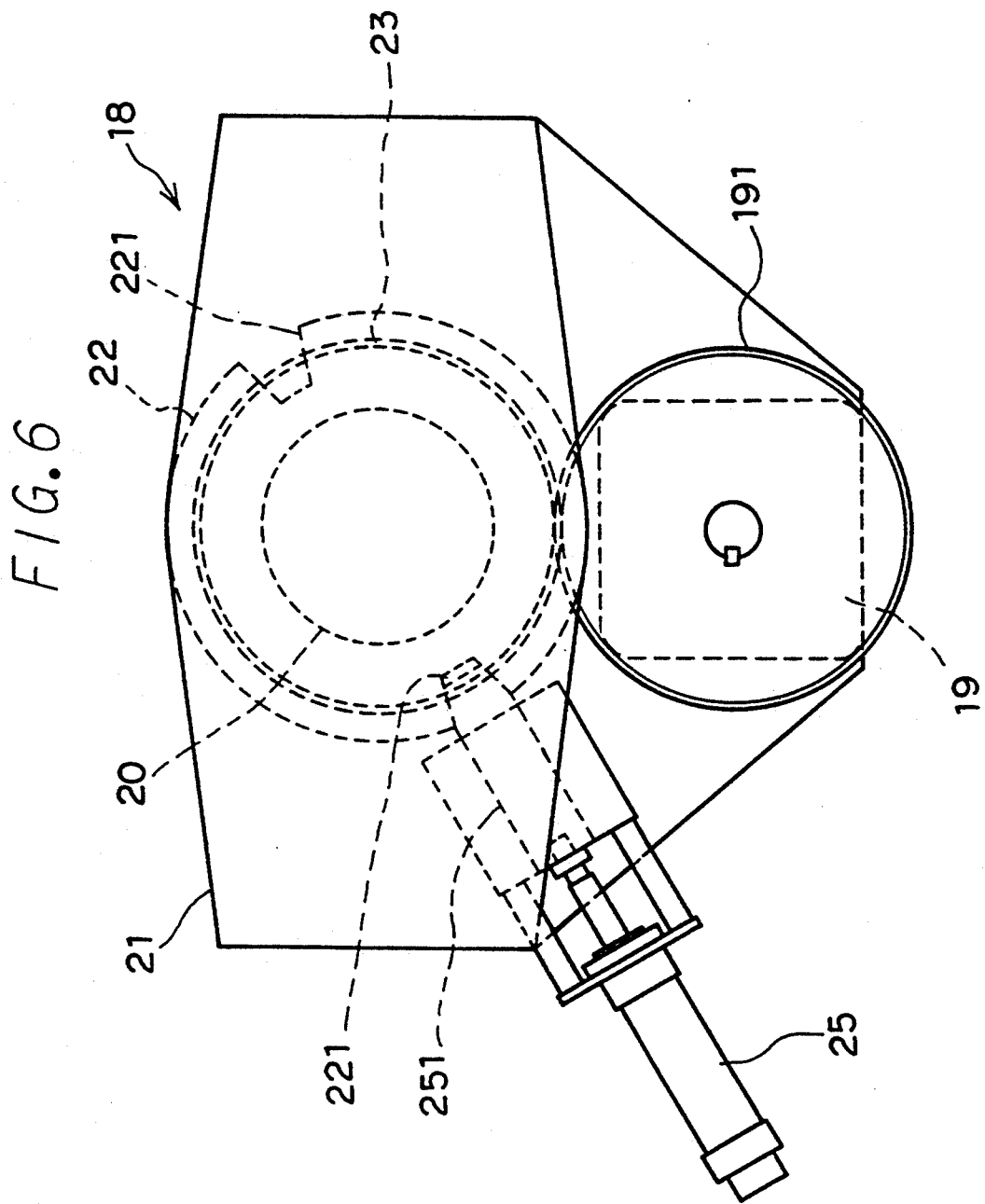
FIG. 6 is a plan view of a grinder mount.
Figure 7:
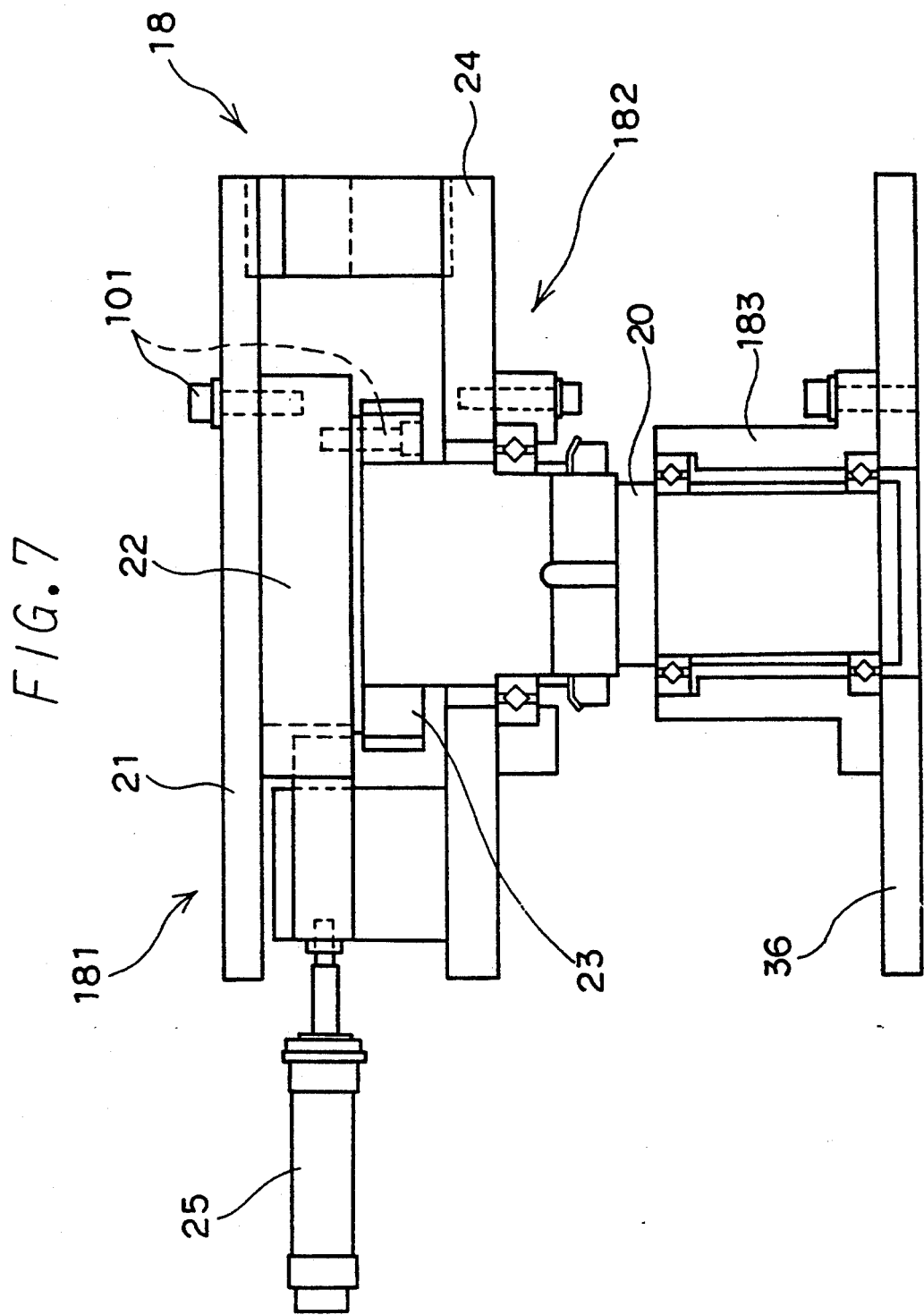
FIG. 7 is a front view of the mount in FIG. 6.
Figure 8:
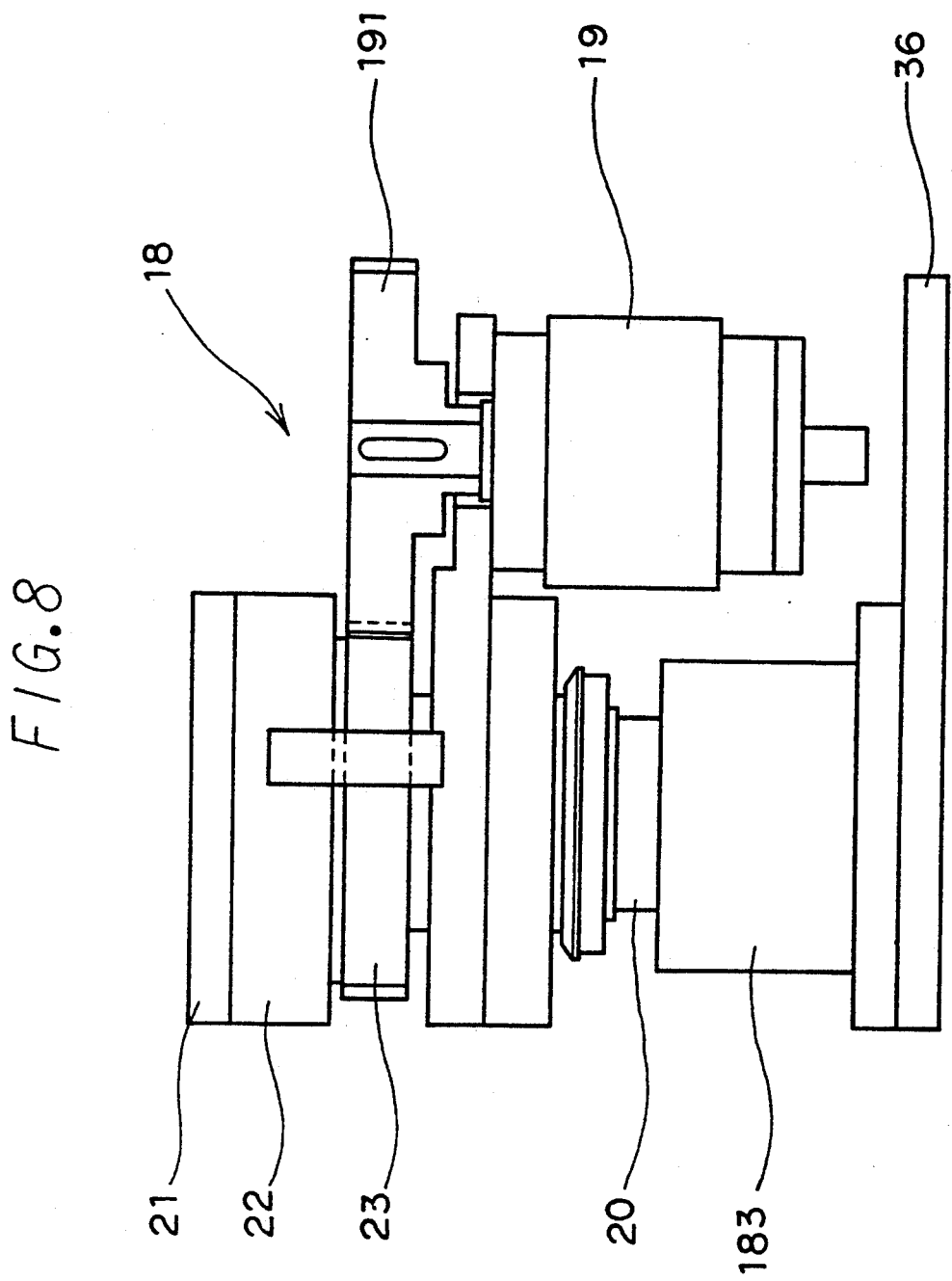
FIG. 8 is a side view of the mount in FIG. 6.

FIGS. 6 to 8 are respectively a plan view, a front view and a side view of the grinder mount 18. The grinder mount 18 comprises a rotatable component 181 and a fixed component 182. The rotatable component 181 comprises an upper plate 21, a lower circular plate 22, a gear 23 and a shaft 20. The plates 21 and 22 and the gear 23 are fixed by bolts 101 to be integrated and this integration is fixed to the shaft 20 immovably. The shaft 20 is rotatably supported with respect to a laterally moving mount 36 by a flange coupling 183. The mount 36 is capable of moving nearly perpendicular to a carrying direction of a tire. The fixed component 182 comprises a plate 24 rotatably engaged with the shaft 20 of the rotatable component 181. The plate 24 is provided with a rotary actuator 19 and an air cylinder 25 for rotating the component 181. A gear 191 provided to the actuator 19 is engaged with the gear 23. The plate 24 is immovably supported with respect to the laterally moving mount 36 by a support member (not shown). A knock 251 is formed at a rod of the cylinder 25. At the lower circular plate 22, knock pits 221 into which the knock 251 is inserted are formed at two opposite positions in the circumference. When the knock 251 of the cylinder 25 is disengaged from the knock pit 221, the grinder mount 18 can rotate together with the shaft 20 by the actuator 19, but when the knock 251 is engaged with the pit 221 the mount 18 can not rotate. Thanks to the above-mentioned structure, the grinder mount 18 on which the grinder unit 13 is mounted can turn around and stop.

Figure 3:
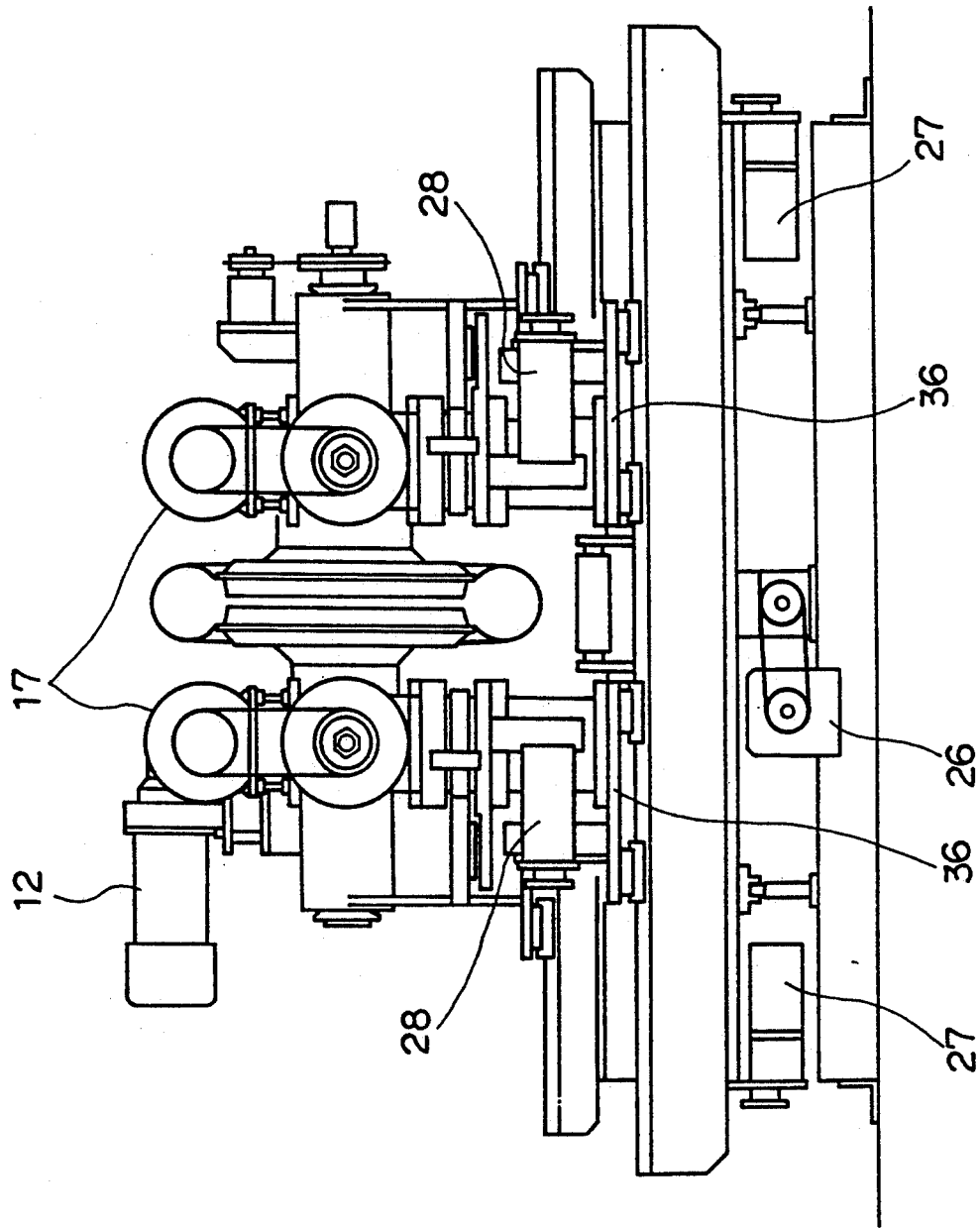
FIG. 3 is a schematic front view of the apparatus in FIG. 1.

After the tire begins to rotate, a pair of the grinder units 13 (located at left hand of the tire holding section in FIG. 1) approaches the tire from their resting position to be set at their operating position. As shown in FIG. 3, positioning of the unit 13 in a tire diameter direction is performed by controlling the laterally moving mount 36 with a motor 26 and positioning of the unit 13 into a rim width direction (namely setting into the operating position) is performed by pushing the mount 36 against the stopper with an air cylinder (not shown). Positioning of the stopper is performed with a motor 27. An inclination angle of the rough grinder and finishing grinder against a part to be grinded is controlled with a motor 28. As these positioning mechanisms, a servo motor or a normal motor controlled with an encoder is preferably used.

As explained above, the setting of the grinder unit 13 to the operating position is performed by controlling the movement of the mount 36 caused by an air cylinder (not shown) in a tire width direction with a stopper (not shown). The positioning of this stopper is performed by the motor 27 and is flexibly adjustable with a feed screw driven by a motor or the like. Thus, the setting of the grinder unit 13 is performed by controlling the motor 27 with an encoder depending on data inherent in a tire size of various kinds which are memorized in a computer, so that a press amount of the unit 13 against the tire is adjusted to a desired one. Since the laterally moving mount 36 mounting with the unit 13 is pushed by an air cylinder (not shown) till the mount 36 contacts with the stopper in every movement toward its operating position, only one initial setting allows the unit 13 on the mount 36 to stop at a constant position in every time if tire size is constant.

In an apparatus of the present invention, for a certain kind of tire, a position in a tire diameter direction, and a press amount and an inclination angle against the tire of the unit 13 are selected first. For this reason, for tires of the same size later supplied, the selection of position of the unit 13 between operating position and resting position can be performed by moving the mount 36 in a tire width direction with an air cylinder (not shown).

When the unit 13 approaches the tire to a predetermined position (operating position), first a white letter portion, a bulge at a sidewall, is ground with the rough grinder 15. After the grinding with the rough grinder 15, the unit 13 is once moved outward in a tire width direction to the resting position by the mount 36, and turns around as stated above. Thereafter the unit 13 again approaches the tire to the operating position by the mount 36 and the white letter portion is finished with the finishing grinder 16. The grinders 15 and 16 are driven by a motor 17. Since the grinders 15 and 16 are driven by one cooperating shaft 14, the apparatus can be made compact and the alignment can get off with only one initial positioning at right side and left side respectively.

If rotating directions of the tire and the grinders are inverted respectively between the grinding step with the rough grinder and the grinding step with the finishing grinder, a better finished surface can be realized.

Figure 9:
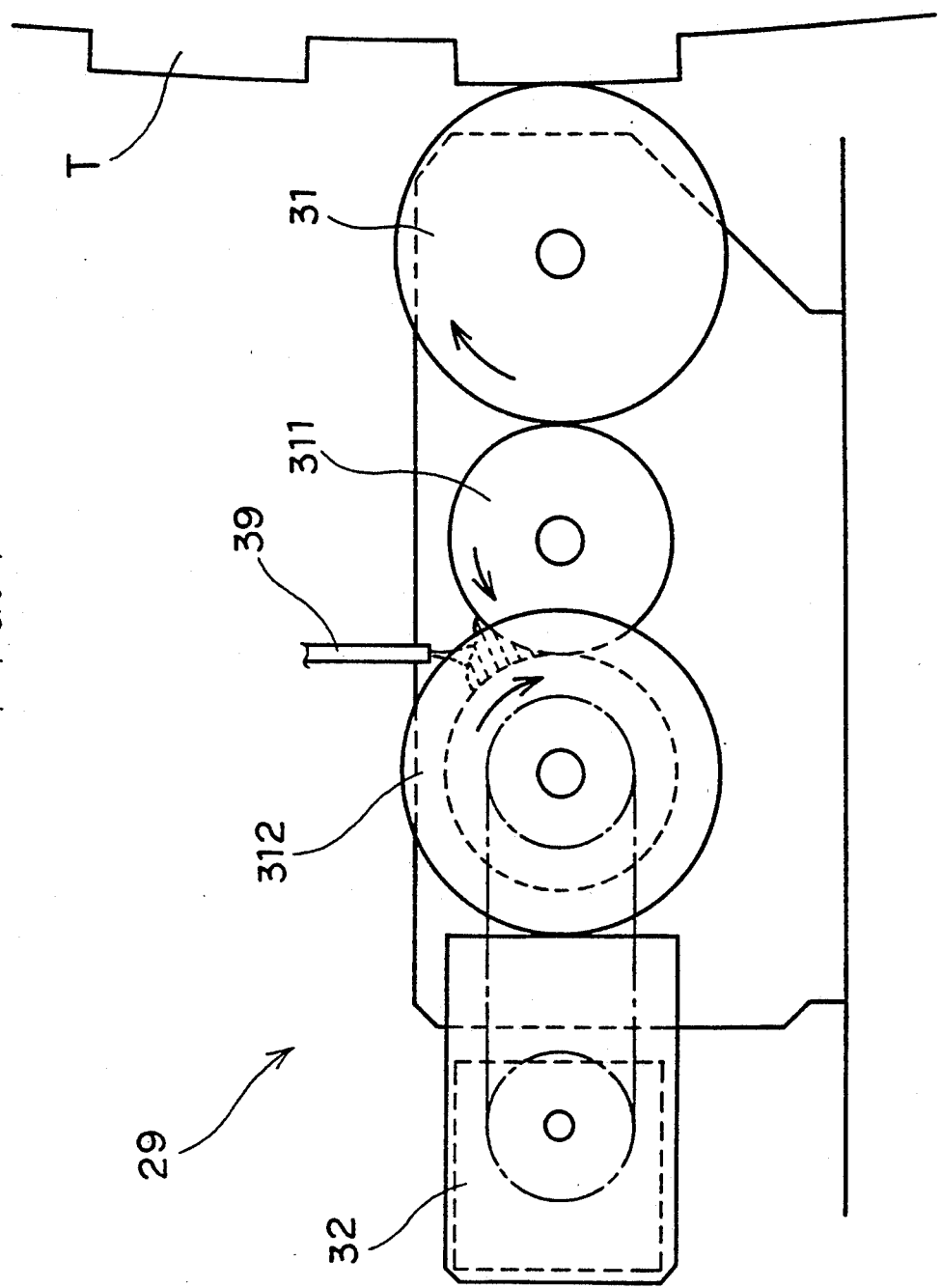
FIG. 9 is an explanatory view showing a front of a paint unit.
Figure 10:
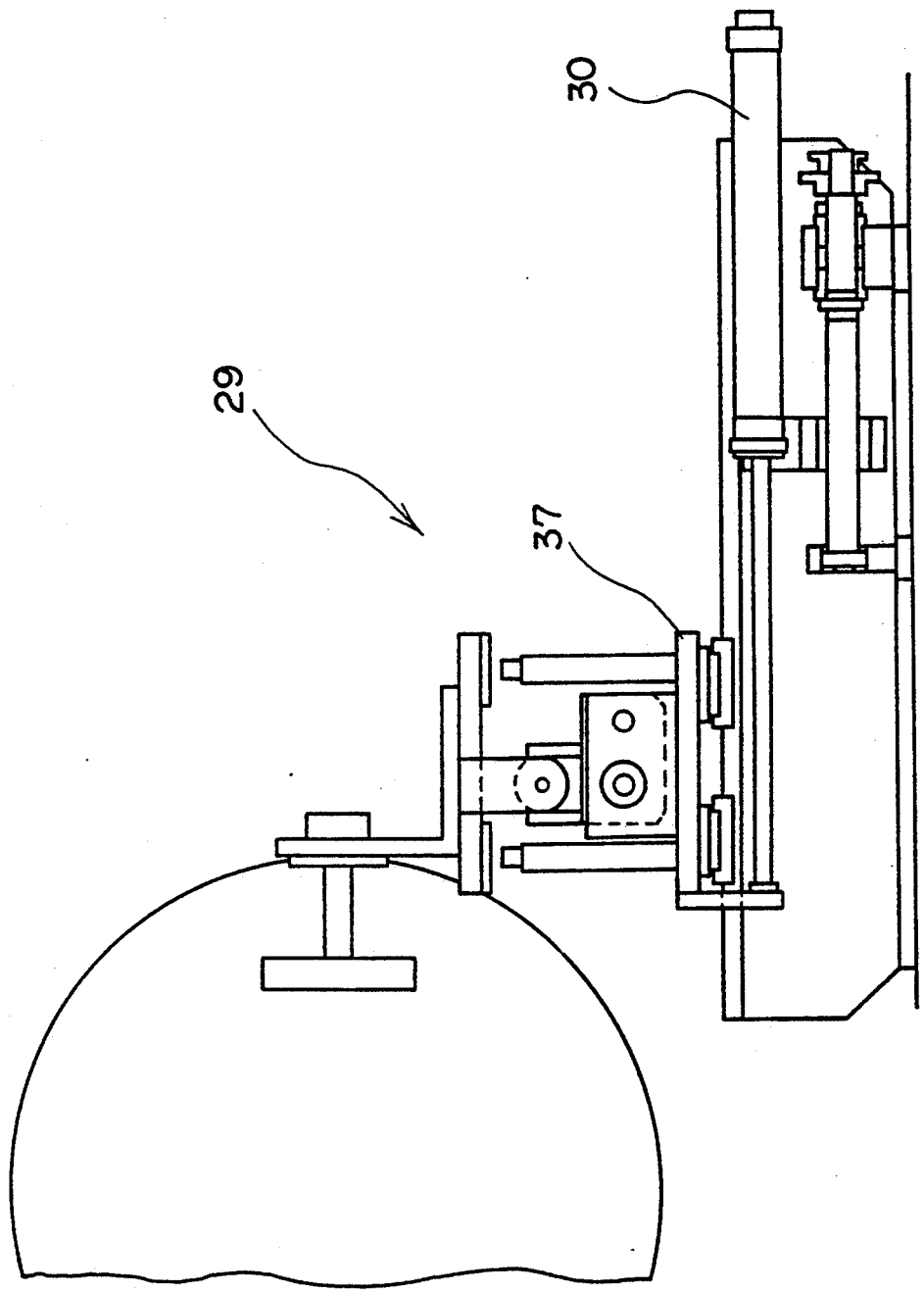
FIG. 10 is a side view of the paint unit in FIG. 9.
Figure 11:
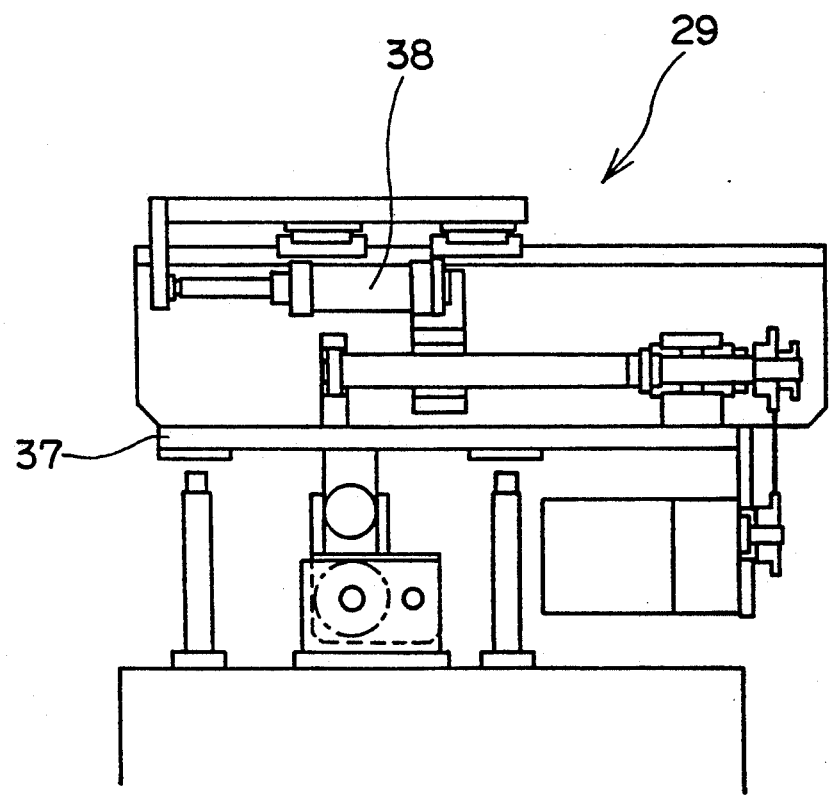
FIG. 11 is a rear view of the paint unit in FIG.

After the grinding steps with the grinders 15 and 16, a pair of paint units 29, located in FIG. 1 at a right hand of the tire holding section 11, approaches the tire to its operating position from its resting position by an air cylinder 30 and applies blue paint to the finished surface of the tire. FIGS. 9 to 11 are respectively a schematic front view, a side view and a rear view of the paint unit 29. During the grinding steps with the grinder unit 13, the paint unit 29 is at the resting position and is surrounded with a booth (not shown) to prevent waste or the like generated in the grinding steps from adhering to a paint roller 31, a knurled roller 311 and a flanged roller 312. After the grinding steps, the booth moves upward and the paint unit 29 approaches the tire T to its operating position with a longitudinally moving mount 37 by the air cylinder 30.

Initial selection of an inclination angle of the paint unit 29 is controlled with a motor or the like (not shown). Positioning of the unit 29 to the operating position is performed almost like in the case of the grinder unit 13. That is, approaching movement to the tire of the longitudinally moving mount 37 caused by the air cylinder in a tire diameter direction is limited by a stopper (not shown). Positioning of this stopper is adjustable with a feed screw driven by a motor or the like and is performed by controlling the motor with an encoder depending on data inherent in a certain tire size of various kinds memorized in a computer, so that it stops at a predetermined position. Since the mount 37 mounting the unit 29 is pushed by the air cylinder 30 till it contacts with the stopper in every movement toward its operating position, only one initial setting of the operating position allows the paint unit 29 to stop at a constant position in every operation.

With respect to controlling of press amount of the paint unit 29, when the unit 29 is located at its operating position, approaching and leaving movement in a tire width direction of the paint roller 31 against the tire T is controlled by another cylinder (not shown) of about 5 mm stroke. That is, the press amount is set in a manner that, at the operating position, when the paint roller 31 approaches the tire by the another cylinder the desired press amount is obtained.

In an apparatus of the present invention, for a certain kind of tire a position in a tire diameter direction, and a press amount and an inclination angle against the tire, of the unit 29 are selected first. For this reason, for tires of the same size later supplied, the selection of position of the unit 29 between operating position and resting position can be performed by moving the mount 37 by the cylinder 30.

The paint unit 29 comprises a paint roller 31 made of hard rubber or felt, a knurled roller 311, a flanged roller 312, and a motor 32 as shown in FIG. 9, and these are mounted on the longitudinally moving mount 37 (refer to FIG. 10) capable of moving in nearly parallel to a tire carrying direction. A paint supply pipe 39 is provided between the rollers 311 and 312. Blue paint from the pipe 39 is supplied to the roller 31 via a groove of the knurled roller 311. As shown in FIG. 9, the roller 312 is rotated by the motor 32 and this driving force is transmitted to the roller 311 and further to the paint roller 31. This transmittion of driving force is achieved by gears (not shown) provided to rear surfaces of each roller.

In the step of applying blue paint with the paint unit 29, the tire rotates more slowly than in the step of grinding, so that the white letter portion is detected by a sensor (not shown) arranged in the vicinity of a side wall of the tire and the approaching and leaving movement of the unit 29 by the another cylinder is controlled to paint only the detected white letter portion.

The painting is performed with a transfer roller. This allows that the painting can be performed without replacing the tire after the buffing, whereby blue paint machine which has been conventionally a separated apparatus can be miniaturized to be an auxiliary part of the buff apparatus. Further the painting can be applied only to a desired portion, thus the present apparatus has also an economic advantage.

After the painting, the tire is air-dried at the very same position. This drying of the tire might be performed by air-drying or by forced drying with a hot air blower and the like.

After the drying the tire stops rotating and the frame holding the rollers 91 and 92 moves upward to support the tire. Thereafter, the tire is deflated, and the rims 10 are unlocked and retreat to leave from each other. Then, the roller 91 moves further upward to push the tire, and the pushed tire rolls on a chute 34 along guides 33 to a discharge carriage 35.

In an apparatus of the present invention, a rough grinder and a finishing grinder are driven by one cooperating shaft, and a grinder unit capable of turning around by 180 degrees and a paint unit of transfer roller-type are employed, whereby the buff apparatus can be miniaturized.

What is claimed is:

1. A method for buffing and painting an annulation comprising:
    a step of rotating the annulation while holding the annulation;
    a step of partially grinding a surface of the annulation with a grinder unit, the grinder unit having a rough grinder and a finishing grinder driven by one cooperating shaft, and being capable of pivoting by 180 degrees to alternately direct the rough grinder and finishing grinder to the surface of the annulation; and
    a step of applying blue paint to the ground surface of the annulation with a transfer-roller paint unit.

2. A buffing and painting apparatus comprising:
    an annulation holding section for rotating an annulation;
    a grinder unit having a rough grinder and a finishing grinder; and
    a paint unit for applying blue paint to a ground surface of the annulation,
    wherein the rough grinder and the finishing grinder on the grinder unit are driven by one cooperating shaft, and the grinder unit is capable of pivoting by 180 degrees to alternately direct the rough grinder and the finishing grinder to the surface of the annulation.

3. The apparatus according to claim 2, wherein the grinder unit is mounted on a grinder mount rotatable by a rotary actuator.

4. The apparatus according to claim 3, wherein said grinder mount includes a rotatable component and a fixed component; the rotatable component has an upper plate, a lower circular plate, a gear and a shaft; the upper plate, the lower plate and the gear are integrally connected and immovably fixed to the shaft; and the fixed component includes a plate rotatably engaged with the shaft of the rotatable component.

5. The apparatus according to claim 4, wherein the grinder mount is a movable mount, and wherein the shaft is rotatably supported with respect to said movable mount by a flange coupling, said movable mount being movable substantially perpendicular to a radial direction of said annulation.

6. The apparatus according to claim 4, wherein the plate of the fixed component is provided with a rotary actuator and an air cylinder for rotating the rotatable component and is immovably supported with respect to the grinder mount which is laterally movable with respect to a radial direction of said annulation.

7. The apparatus according to claim 6, further including means, formed at diametrically opposed positions in a circumference of the lower circular plate, for enabling the grinder mount to be rotated together with the shaft by the rotary actuator and for preventing rotation of the grinder mount.

* * * * *